US012370571B2

(12) United States Patent
Hüglin et al.

(10) Patent No.: US 12,370,571 B2
(45) Date of Patent: Jul. 29, 2025

(54) MULTI-CHAMBER CARTRIDGE

(71) Applicant: fischerwerke Gmbh & Co. KG, Waldachtal (DE)

(72) Inventors: Simon Hüglin, Herbolzheim (DE); Clemens Schmidt, Denzlingen (DE); Konstantin Schelleis, Freiburg (DE)

(73) Assignee: fischerwerke Gmbh & Co. KG, Waldachtal (DE)

(*) Notice: Subject to any disclaimer, the term of this patent is extended or adjusted under 35 U.S.C. 154(b) by 179 days.

(21) Appl. No.: 18/384,606

(22) Filed: Oct. 27, 2023

(65) Prior Publication Data

US 2024/0149294 A1 May 9, 2024

(30) Foreign Application Priority Data

Nov. 4, 2022 (DE) ..................... 10 2022 129 137.5

(51) Int. Cl.
*B05C 17/01* (2006.01)

(52) U.S. Cl.
CPC ................................ *B05C 17/0106* (2013.01)

(58) Field of Classification Search
CPC ............ B05C 17/0106; B65D 81/3255; B65D 81/325
See application file for complete search history.

(56) References Cited

U.S. PATENT DOCUMENTS 5,918,772 A * 7/1999 Keller ............... B05C 17/00509 222/145.5
8,925,764 B2 * 1/2015 Hiemer ............... B29C 45/4407 222/326
2014/0158717 A1 * 6/2014 Ettlin ................ B05C 17/00559 222/137

(Continued)

FOREIGN PATENT DOCUMENTS

CN 2 16 510 350 U 5/2022
DE 202 02 620 U1 4/2003
DE 102014211009 A1 12/2014

(Continued)

OTHER PUBLICATIONS

Search Report for corresponding German Application No. 10 2022 129 137.5, dated May 11, 2023.

*Primary Examiner* — Donnell A Long
(74) *Attorney, Agent, or Firm* — Renner, Otto, Boisselle & Sklar, LLP

(57) ABSTRACT

A multi-chamber cartridge having an outer tube and an inner tube arranged coaxially in the outer tube for a separate storage of two components—e.g., a hardener and binder of a two-component synthetic resin. The multi-chamber cartridge has a pushing-out element with four cutting edges, which cut the inner tube of the multi-chamber cartridge into four strips when the multi-chamber cartridge is pushed out, that roll up, fold, and/or bunch up in four receiving spaces in the pushing-out element. The pushing-out element has a head pin, the head of which seals in the inner tube. In order (Continued)

to injection-mold the pushing-out element from plastic, a collar of the pushing-out element surrounding the head pin has two collar openings opposite each other, through which two sliders of an injection mold for demolding the pushing-out element are pulled out after injection molding, that form a shank of the head pin.

9 Claims, 2 Drawing Sheets

(56) References Cited

U.S. PATENT DOCUMENTS

| | | | | |
|---|---|---|---|---|
| 2015/0239638 A1* | 8/2015 | Lee | B65D 39/08 206/219 | |

FOREIGN PATENT DOCUMENTS

| | | | | | |
|---|---|---|---|---|---|
| DE | 10 2013 107 955 | A1 | | 1/2015 | |
| DE | 102014105009 | A1 | | 10/2015 | |
| DE | 10 2016 104 409 | A1 | | 9/2017 | |
| DE | 10 2018 117 143 | A1 | | 1/2020 | |
| EP | 0093185 | A1 | * | 11/1983 | B65D 83/76 |
| EP | 2353733 | A1 | | 8/2011 | |
| EP | 2384883 | A1 | | 11/2011 | |
| WO | WO-2005095225 | A1 | * | 10/2005 | B01F 25/12 |
| WO | 13124670 | A1 | | 8/2013 | |

* cited by examiner

MULTI-CHAMBER CARTRIDGE

CROSS-REFERENCE TO RELATED APPLICATION

This application claims priority under 35 USC § 119 to German Application No. 10 2022 129 137.5, filed on Nov. 4, 2022, the entire disclosure of which is incorporated herein by reference.

TECHNICAL FIELD OF THE INVENTION

The invention relates to a multi-chamber cartridge.

DESCRIPTION OF THE RELATED ART

Multi-chamber cartridges are used for a separate storage of flowable, e.g., liquid, and in particular viscous or pasty, components of a compound which sets, solidifies, or hardens when its components are mixed. The compound is, for example, a resin with a binder as one component and a hardener as another component. In this case, the compound is a 2-component compound whose two components are contained separately from one another in two chambers of the multi-chamber cartridge, wherein, in this case, the multi-chamber cartridge is a two-chamber cartridge.

The patent application DE 10 2018 117 143 A1 discloses a two-chamber cartridge with a cylindrical outer tube in which an inner chamber is separated with a partition wall that is V-shaped in a cross-section through the two-chamber cartridge. For pushing out components contained in the outer tube and inner chamber, the known two-chamber cartridge has a plunger as a pushing-out element which is displaced in the direction of a front end of the two-chamber cartridge for pushing out, where the two-chamber cartridge has an outlet for the outer tube and the inner chamber through which the components emerge from the outer tube and from the inner chamber and are mixed, for example, in a static mixer placed on the outlet. The plunger forming the pushing-out element has two cutting edges on its circumference which, when the plunger is displaced to the front end of the two-chamber cartridge, cut through the V-shaped partition wall on an inner circumference of the outer tube, and a center cutting edge which cuts through the V-shaped partition wall at its apex such that the V-shaped partition wall is cut into two strips which roll up in the plunger. The known two-chamber cartridge can be pushed out using a conventional cartridge gun for a single chamber cartridge. Cartridge guns of this kind are also referred to as cartridge presses or caulking guns.

SUMMARY OF THE INVENTION

The object of the invention is to propose a multi-chamber cartridge with an inner tube which can be pushed out with a conventional cartridge gun for a single chamber cartridge and which has a good seal in the inner tube.

This object is achieved according to the invention via features described herein. The multi-chamber cartridge according to the invention is provided for separate storage and jointly pressing out several components of a compound. The multi-chamber cartridge according to the invention has a longitudinal axis, an outer tube which is parallel to the longitudinal axis, and in particular concentric, and an inner tube arranged parallel and preferably concentrically to the longitudinal axis in the outer tube. When the multi-chamber cartridge is filled, a component of the compound is contained in the inner tube, and another component is contained in an intermediate space between the inner tube and the outer tube. At one end of the multi-chamber cartridge, which is referred to here as the front end, the multi-chamber cartridge has an outlet for the outer tube and for the inner tube. The outlet for the outer tube communicates with the intermediate space between the outer tube and the inner tube such that, when the multi-chamber cartridge is pushed out, the component of the compound contained in the intermediate space between the outer tube and the inner tube exits through the outlet for the outer tube. The outlet for the inner tube communicates with the inner tube such that, when the multi-chamber cartridge is pushed out, the component of the compound contained in the inner tube exits through the outlet for the inner tube. The outlets for the outer tube can, for example, be arranged next to one another or one inside the other, open into one another, or the multi-chamber cartridge has a common outlet for the outer tube and the inner tube.

To push out the components of the compound, the multi-chamber cartridge according to the invention has a plunger or the like, which is generally referred to here as "pushing-out element." The pushing-out element is displaceable in the outer tube in the direction of the longitudinal axis of the multi-chamber cartridge and is displaced in the direction of the front end of the multi-chamber cartridge to push out the multi-chamber cartridge. In this case, the pushing-out element pushes the components contained in the inner tube and in the intermediate space between the outer tube and the inner tube in the direction of the front end of the multi-chamber cartridges, where the components exit through the outlet or outlets from the multi-chamber cartridge.

The pushing-out element of the multi-chamber cartridge according to the invention has at least one cutting edge which, when the pushing-out element is displaced in the outer tube of the multi-chamber cartridge in the direction of the front end of the multi-chamber cartridge, cuts through the inner tube in a longitudinal direction. The longitudinal direction extends in particular parallel to the longitudinal axis of the multi-chamber cartridge, or in any case has a component parallel to the longitudinal axis of the multi-chamber cartridge. For example, it is possible to cut through the inner tube in a helical or undulating manner. Preferably, the pushing-out element of the multi-chamber cartridge according to the invention has several cutting edges which, when the pushing-out element is displaced in the direction of the front end of the multi-chamber cartridge, cut the inner tube into strips in the longitudinal direction at several points of its circumference which extend in the longitudinal direction of the multi-chamber cartridge and over a limited circumference of the inner tube. When the pushing-out element is displaced in the direction of the front end of the multi-chamber cartridge, the strips can be rolled up, folded, or bunched up in a cavity of the pushing-out element, which, however, is not absolutely necessary for the invention.

The pushing-out element of the multi-chamber cartridge according to the invention has an inner plunger which is located at least partially in the inner tube and which has a circumferential inner seal which bears in a circumferentially sealing manner against an inner circumference of the inner tube. The inner seal is preferably an integral component of the inner plunger. Preferably, the inner seal seals absolutely tightly against the inner circumference of the inner tube in order to prevent premature hardening or aging of the compound contained in the inner tube. However, the invention is also intended to include internal seals that are not absolutely tight, which, for example, permit, or at least do not in all cases prevent, a gas exchange between the inner tube and an environment, or which permit the inner plunger from moving past residues of the component contained in the inner tube which adhere to the inner circumference of the inner tube.

Behind the inner seal, i.e., on a side, facing away from the front end of the multi-chamber cartridge, of the inner seal, the inner plunger tapers to form a preferably circumferential undercut. This enables an axially short inner seal which improves the sealing in the inner tube and/or facilitates a displaceability of the inner plunger in the inner tube and accordingly a displaceability of the pushing-out element in the multi-chamber cartridge.

In the intermediate space between the outer tube and the inner tube, the inner seal of the inner plunger of the pushing-out element is surrounded by a tubular collar of the pushing-out element. According to the invention, the collar has an opening which is located radially outside the undercut at the tapering of the inner plunger behind the inner seal. Due to the opening, the undercut of the inner plunger behind the inner seal is accessible radially from the outside through the collar of the pushing-out element. This enables injection molding of the pushing-out element together with the inner plunger in one piece of plastic, wherein a slider that is movable radially in an injection mold forms the undercut behind the inner seal of the inner plunger. After the injection molding, the slider can be pulled radially out of the collar, and the pushing-out element can then be demolded.

One embodiment of the invention provides that the inner seal or a sealing surface of the inner seal have the shape of a cylindrical ring. The sealing surface is a surface abutting the inner circumference of the inner tube. It is in particular an outer circumferential surface on the inner plunger which has a larger diameter than the inner plunger behind the inner seal or behind the sealing surface. “Behind” means a section of the inner plunger adjoining the inner seal or its sealing surface on a side facing away from the front end of the multi-chamber cartridge.

In particular, the inner seal or its sealing surface is axially short, i.e., it has an axial length of one or a few millimeters and/or is axially shorter than a diameter or a radius of the sealing surface.

One embodiment of the invention provides a head pin as an inner plunger. The head pin has a head with a larger diameter or generally a larger circumference than a shaft of the head pin which adjoins the head on the side facing away from the front end of the multi-chamber cartridge. The shaft of the head pin merges integrally with the pushing-out element at one foot or is connected to the pushing-out element in some other way—preferably rigidly. The circumference of the head forms the inner seal or its sealing surface. At a transition from the head into the shaft of the head pin, the head pin forming the inner plunger has the circumferential undercut with which the head pin tapers from its head to its shaft.

In a preferred embodiment of the invention, the collar of the pushing-out element has two openings which are opposite one another in relation to the longitudinal axis of the multi-chamber cartridge. As a result, when the pushing-out element is injection molded from plastic, the circumferential undercut at the rear end of the inner seal or the head of the head pin which forms the inner plunger can be formed with two sliders which are arranged opposite one another and which are pulled out of the collar radially following the injection molding of the pushing-out element, after which the pushing-out element can be demolded.

The collar of the pushing-out element of the multi-chamber cartridge according to the invention that surrounds the head pin or the head of the head pin forming the inner plunger forms, in one embodiment of the invention, a seal holder for a central seal and/or for an outer seal. The central seal seals against an outer circumference of the inner tube, and the outer seal seals against an inner circumference of the outer tube of the multi-chamber cartridge.

The cutting edge of the pushing-out element which cuts through the inner tube in the longitudinal direction when the pushing-out element is displaced in the direction of the front end of the multi-chamber cartridge is preferably offset to the rear in relation to the inner seal. This means that the cutting edge is at a greater distance from the front end of the multi-chamber cartridge than the inner seal. As a result, the inner seal seals in a section of the inner tube that is not yet cut through by the cutting edge.

In embodiments of the invention, the cutting edge is located in an axial plane of the longitudinal axis of the multi-chamber cartridge or in a plane parallel to the axial plane.

In a preferred embodiment of the invention, the pushing-out element has several cutting edges which are offset relative to one another in the circumferential direction. The cutting edges can be arranged distributed evenly or unevenly over the circumference. They cut the inner tube into several strips which, when the pushing-out element is displaced in the direction of the front end of the multi-chamber cartridge, roll up, fold together, or bunch up, for example, in a cavity of the pushing-out element.

At a front end facing the front end of the multi-chamber cartridge, the inner plunger tapers in front of the inner seal with an insertion bevel which facilitates insertion of the inner plunger into the inner tube of the multi-chamber cartridge.

The features and feature combinations, embodiments, and designs of the invention as mentioned above in the description, as well as the features and feature combinations as mentioned below in the description of figures and/or drawn in a figure, are usable not only in the combination indicated or shown in each case; rather, in principle, any other combinations are also usable, or said features can be used individually. Embodiments of the invention are possible which do not have all features of a dependent claim. Individual features of a claim can also be replaced by other disclosed features or feature combinations. Embodiments of the invention are possible which do not have all the features of the exemplary embodiment, but, rather, a fundamentally arbitrary part of the features of the exemplary embodiment.

BRIEF DESCRIPTION OF THE DRAWINGS

The invention is explained in more detail below using an exemplary embodiment illustrated in the drawing. In the drawings.

DETAILED DESCRIPTION OF THE EMBODIMENT(S)

Figure 1:
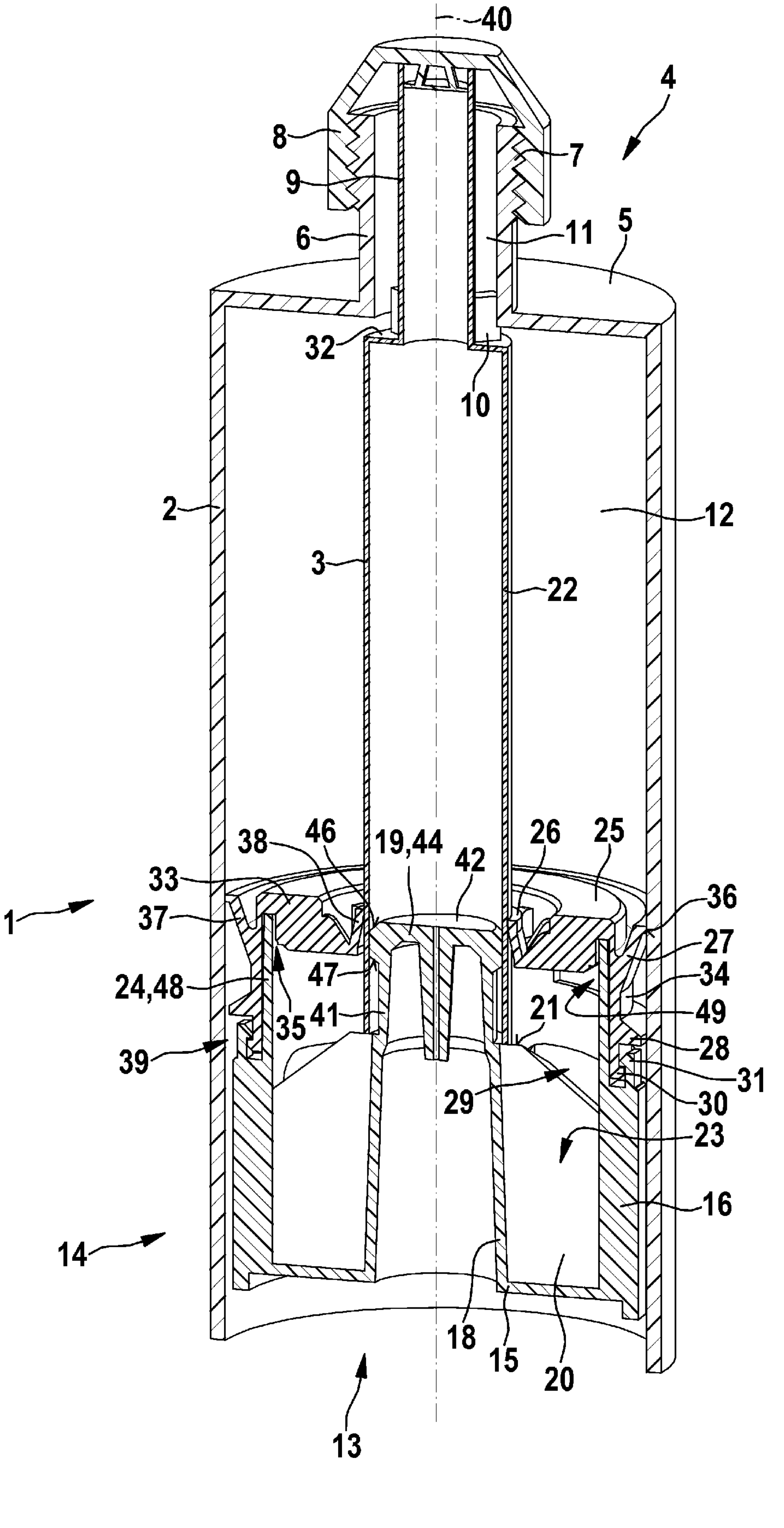
FIG. 1 shows a multi-chamber cartridge according to the invention in a perspectival axial sectional view.

The multi-chamber cartridge 1 according to the invention shown in FIG. 1 is a two-chamber cartridge with a longitudinal axis 40, an outer tube 2 coaxial with the longitudinal axis 40, and an inner tube 3, likewise coaxial with the longitudinal axis 40, which is arranged in the outer tube 2. An inner tube 3 (not shown) arranged eccentrically and parallel to the longitudinal axis 40 in the outer tube 2 is also possible. At an end face, which is referred to here as the front end 4 of the outer tube 2 and the multi-chamber cartridge 1, the outer tube 2 has a perforated-disk-like front wall 5 from whose center hole a tubular socket 6 projects coaxially outwards. The socket 6 has an external thread 7, onto which, in the drawing, a cover 8 is screwed which closes the socket 6.

An outlet 9 for the inner tube 3—in the shape of a cylindrical tube in the exemplary embodiment—is arranged coaxially in the socket 6 and is fastened in the socket 6 by ribs 10 arranged radially in a star shape. Via a perforated-disc-like annular step 32, the inner tube 3 transitions into the outlet 9 at the front end 4, as a result of which the inner tube 3 is held coaxially in the outer tube 2 of the two-chamber or multi-chamber cartridge 1. The socket 6 surrounding the outlet 9 of the inner tube 3, or an annular space surrounding the outlet 9 of the inner tube 3 in the socket 6, forms an outlet 11 of the outer tube 2 or an outlet 11 of an annular intermediate space 12 surrounding the inner tube 3 in the outer tube 2. The cover 8 closes the outlet 11 of the outer tube 2 and the outlet 9 of the inner tube 3 when it is screwed onto the socket 6.

The outer tube 2, or the intermediate space 12 between the outer tube 2 and the inner tube 3, and the inner tube 3 serve for separate storage of two flowable, and in particular viscous or pasty, components of a compound which sets, solidifies, or hardens after its components have been mixed. For example, the outer tube 2 and the inner tube 3 serve for separate storage of a binder and a hardener of a two-component synthetic resin. To discharge the two components, a hollow-frustoconical discharge nozzle (not shown) or a tubular static mixer (not shown) instead of the cover 8 can be screwed onto the socket 6 of the multi-chamber cartridge 1 which mixes the components of the compound stored separately in the outer tube 2 and the inner tube 3 when the components are pushed through the outlets 9, 11 of the two-chamber or multi-chamber cartridge 1 and flow through the static mixer (not shown).

Figure 2:
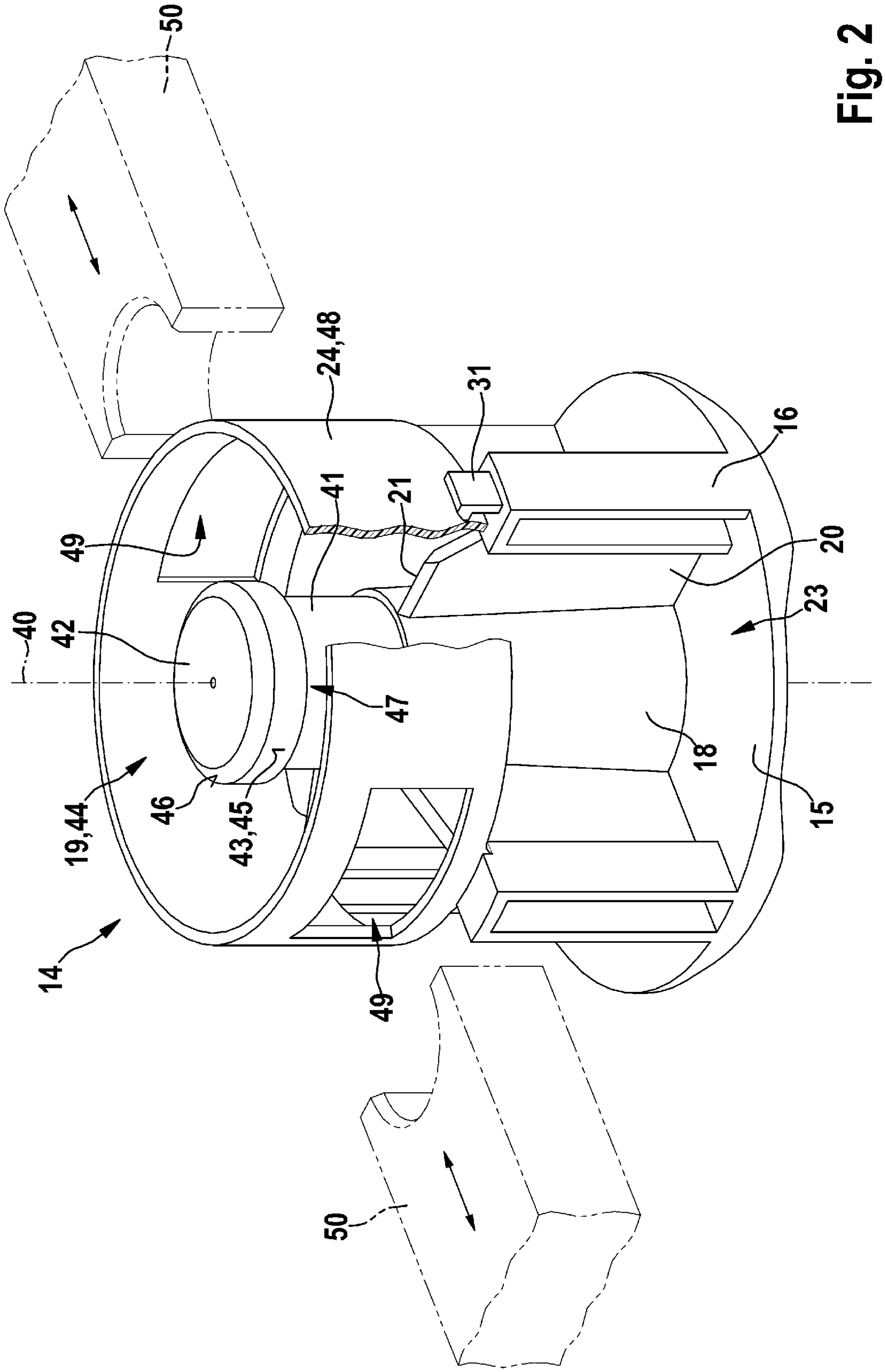
FIG. 2 shows a perspectival view of a pushing-out element of the multi-chamber cartridge from FIG. 1 as an individual part.

At a rear end 13 of the multi-chamber cartridge 1 remote from the front end 4, the outer tube 2 and the inner tube 3 are open or closed with a pushing-out element 14 which is arranged in the rear end 13 of the multi-chamber cartridge 1 or the outer tube 2, and is displaceable forwards in the direction of the longitudinal axis 40 in the multi-chamber cartridge 1 or in the outer tube 2 of the multi-chamber cartridge 1 in the direction of the front end 4. The pushing-out element 14 can also be regarded as a piston or as a plunger for pushing out the multi-chamber cartridge 1. It is shown in FIG. 2 as an individual part. As a result of a displacement of the pushing-out element 14 in the outer tube 2 in the direction of the front end 4 of the multi-chamber cartridge 1, the pushing-out element 14 pushes the annular intermediate space 12 surrounding the inner tube 3 in the outer tube 2 and components of the compound which are stored separately in the inner tube 3 through the outlets 9, 11 in the front-end out of the multi-chamber cartridge 1. The pushing-out of the components can also be understood as the pushing out of the multi-chamber cartridge 1. The cover 8 must be removed prior to the pushing out.

In order to displace the pushing-out element 14 in the outer tube 2 of the multi-chamber cartridge 1 and to push out the multi-chamber cartridge 1, the multi-chamber cartridge 1 is manually, electromotively, pneumatically, or otherwise inserted into a cartridge gun, which is known per se and is not shown here, which cartridge gun is also referred to as a cartridge press or caulking gun.

The pushing-out element 14 has a perforated-disk-like rear wall 15 which is arranged coaxially with respect to the longitudinal axis 40 of the multi-chamber cartridge 1 and in a radial plane of the longitudinal axis 40 in the outer tube 2, and extends up to or close to an inner circumference of the outer tube 2. The rear wall 15 is located on a rear side, facing away from the front end 4 and the outlets 9, 10, of the pushing-out element 14.

From a front side, facing the front end 4 of the multi-chamber cartridge 1, of the rear wall 15, supports 16 project forwards parallel to the axis in the direction of the front end 4 of the multi-chamber cartridge 1. The supports 16 are arranged on an outer circumference of the rear wall 15 and guide the pushing-out element 14 axially displaceably in the outer tube 2 of the multi-chamber cartridge 1 such that they support the pushing-out element 14 against tilting about an imaginary radial axis in the outer tube 2.

In the exemplary embodiment, the pushing-out element 14 has four supports 16 which are offset relative to one another by 90° in a circumferential direction, i.e., are arranged distributed evenly over a circumference. Another number of supports 16 and/or an unevenly distributed arrangement over the circumference are possible (not shown).

Between the supports 16, at a center of the front of the rear wall 15 of the pushing-out element 14, a hollow-frustoconical upright 18 projects in the direction of the front end 4 of the multi-chamber cartridge 1. A head pin 19 projects from the upright 18 of the pushing-out element 14 in the direction of the front end 4 of the multi-chamber cartridge 1 from a smaller, front cover surface of the upright 18, i.e., facing the front end 4 of the multi-chamber cartridge 1. The head pin 19 is arranged coaxially in the inner tube 3 of the multi-chamber cartridge 1; in the exemplary embodiment, the head pin 19 is coaxial with the longitudinal axis 40 of the multi-chamber cartridge 1.

The head pin 19 has a shaft 41, which is cylindrical in the exemplary embodiment, and a head 42 on a front end facing the front end 4 of the multi-chamber cartridge 1. The head 42 has a larger diameter than the shaft 41; the head 42 protrudes radially beyond the shaft 41. The head 42 is shaped like a perforated disk and has a cylindrical circumferential surface which as a sealing surface 43 circumferentially seals against an inner circumference of the inner tube 3 of the multi-chamber cartridge 1. The head pin 19 forms an inner plunger 44 of the pushing-out element 14 for pushing out the inner tube 3 of the multi-chamber cartridge 1 and its head 42, or its sealing surface 43, forms a circumferential inner seal 45 of the pushing-out element 14 for sealing in the inner tube 3. The inner seal 45 is axially short; in the exemplary embodiment, it has an axial length between approximately 2-3 mm. As a result, it has a good sealing effect on the inner circumference of the inner tube 3 of the multi-chamber cartridge 1 and nevertheless slides easily in the inner tube 3.

On a front side which faces the front end 4 of the multi-chamber cartridge 1, the head 42 of the head pin 19, which forms the inner plunger 44, has a circumferential bevel as an insertion bevel 46 which facilitates an introduction of the inner plunger 44 into the rear end of the inner tube 3 of the multi-chamber cartridge 1. The insertion bevel 46 is a circumferential and annular inclined surface at a transition from the circumferential surface to a front end face of the head 42 of the head pin 19. As described, the circumferential surface of the head 42 forms the circumferential sealing surface 43 or the inner seal 45.

At a rear side which faces the shaft 41, the head 42 of the head pin 19 transitions into the shaft 41 with an annular step. The annular step forms an undercut 47 on or with which the head pin 19 tapers at a transition from its head 42 to its shaft 41. In the exemplary embodiment, the undercut 47 is designed in the manner of a bevel as an annular, circumferential inclined surface which, however, is not absolutely necessary for the invention. As described, the head pin 19 forms the inner plunger 44 of the pushing-out element 14 of the multi-chamber cartridge 1 according to the invention which tapers behind the inner seal 45, wherein "behind" means on the rear side, facing away from the front end 4 of the multi-chamber cartridge 1, of the head 42.

Partition walls 20 are arranged between the supports 16 and the upright 18. In the exemplary embodiment, the partition walls 20 are located in two axial planes intersecting one another at right angles.

Front edges, facing away from the rear wall 15 of the pushing-out element 14 and towards the front end 4 of the multi-chamber cartridge 1, of the partition walls 20 are formed with sharp edges as cutting edges 21 in radially inner sections adjoining the upright 18. Axially, or viewed in the direction of the longitudinal axis 40 of the multi-chamber cartridge 1, the cutting edges 21 cross a wall 22 of the inner tube 3 of the multi-chamber cartridge 1 in such a way that, when the pushing-out element 14 is displaced forwards in the direction of the front end 4 of the multi-chamber cartridge 1 for pushing out the multi-chamber cartridge 1, the cutting edges 21 of the pushing-out element 14 cut the wall 22 of the inner tube 3 in the direction of the longitudinal axis 40 of the multi-chamber cartridge 1 into strips—four in the exemplary embodiment.

When the pushing-out element 14 is displaced forwards, the strips, into which the cutting edges 21 of the pushing-out element 14 cut the inner tube 2 of the multi-chamber cartridge 1, enter receiving spaces 23 at or before the front side of the rear wall 15 of the pushing-out element 14. The receiving spaces 23 are bounded at the rear in the direction of the rear end 13 of the multi-chamber cartridge 1 by the rear wall 15, and in the circumferential direction by the partition walls 20. During the displacement of the pushing-out element 14 for, or when, pushing out the multi-chamber cartridge 1, the strips, into which the cutting edges 21 of the pushing-out element 14 cut the wall 22 of the inner tube 3, roll, fold, crumple, or deform in the receiving spaces 23 of the pushing-out element 14.

With respect to the inner seal 45, the cutting edges 21 are offset to the rear, i.e., towards the rear wall 15 of the pushing-out element 14 or towards the rear end 13 of the multi-chamber cartridge 1, so that the inner seal 45 seals within an uncut section of the inner tube 3 of the multi-chamber cartridge 1.

A cylindrical collar 48, which surrounds the head 42 of the head pin 19 forming the inner plunger 44, is arranged as an outer seal holder 24 concentrically on the front ends, facing the front end 4 of the multi-chamber cartridge 1, of the supports 16 of the pushing-out element 14. Axially, the collar 48 protrudes both forwards and backwards beyond the head 42. The collar 48 forming the outer seal holder 24 is located in the intermediate space 12 between the outer tube 2 and the inner tube 3 of the multi-chamber cartridge 1. The collar 48 encloses the inner tube 3 at a radial distance; in the exemplary embodiment, the collar 48 is closer to the outer tube 2 than to the inner tube 3.

In order to be able to injection mold the pushing-out element 14 in one piece from plastic, the collar 48 has two collar openings 49 on opposite circumferential points which are so wide in a circumferential direction that they cover the shaft 41 of the head pin 19 when viewed radially. Axially, the two collar openings 49 in the exemplary embodiment extend from the undercut 47 on the rear side of the head 42 of the head pin 19 up to the front end of the upright 18 from which the shaft 41 of the head pin 19 projects forwards. The collar openings 49 can be axially higher towards the front and/or towards the rear.

During the injection molding of the pushing-out element 14, two sliders 50, shown with dash-dot lines in FIG. 1, of an injection molding tool otherwise not shown are located in the collar openings 49 of the collar 48 of the pushing-out element 14. During the injection molding of the pushing-out element 14, the sliders 50 form the shaft 41 of the head pin 19 and the undercut 47 on the rear side of the head 42 of the head pin 19. For demolding the pushing-out element 14 from the injection mold (not shown), the two sliders 50 are pulled radially out of the collar openings 49 after injection molding; the injection mold is subsequently opened, and the pushing-out element 14 is demolded.

A perforated-disk-shaped elastic sealing element 25 is arranged on a front edge, facing the front end 4 of the multi-chamber cartridge 1, of the outer seal holder 24 and seals against an inner circumference of the outer tube 2 and against an outer circumference of the inner tube 3 of the multi-chamber cartridge 1. The sealing element 25 has an annular sealing base body 33 with circumferential sealing lips 26, 27 on an inner circumference and on an outer circumference of the sealing base body 33. A tubular collar 34 protrudes from the sealing base body 33 of the sealing element 25 from a rear side, facing away from the front end 4 of the multi-chamber cartridge 1, of the annular sealing base body 33 of the sealing element 25 and encloses the cylindrical outer seal holder 24 of the pushing-out element 14. In the exemplary embodiment, the tubular collar 34 of the sealing base body 33 of the sealing element 25 rests against an outer circumference of the outer seal holder 24 of the pushing-out element 14 and has a smaller diameter than the outer tube 2 of the multi-chamber cartridge 1, such that there is an annular space outside around the tubular collar 34 of the sealing element 25 between the tubular collar 34 of the sealing element 25 and the outer tube 2 of the multi-chamber cartridge 1.

On an inner circumference of the tubular collar 34, the annular sealing base body 33 of the sealing element 25 has, in its rear side facing away from the front end 4 of the multi-chamber cartridge 1, an annular groove 35 with a groove cross-section corresponding to the cylindrical outer seal holder 24 of the pushing-out element 14, into which groove cross-section the outer seal holder 24 engages.

The two sealing lips 26, 27 are hollow-frustoconical, i.e., the sealing lips 26, 27 of the sealing element 25 have the shape of lateral surfaces of truncated cones. An inner one of the two sealing lips 26 tapers in the direction of the front end 4 of the multi-chamber cartridge 1 such that it rests sealingly with a circumferential front end edge against the outer circumference of the inner tube 3. An outer one of the two sealing lips 27 expands in the direction of the front end 4 of the multi-chamber cartridge 1 such that it rests sealingly with a circumferential front end edge against the inner circumference of the outer tube 2 of the multi-chamber cartridge 1. The circumferential lines or circumferential strip-shaped surfaces, narrow in the axial direction of the multi-chamber cartridge 1, on which surfaces the sealing lips 26, 27 of the sealing element 25 sealingly rest against the outer circumference of the inner tube 3 or on the inner circumference of the outer tube 2 of the multi-chamber cartridge 1, are referred to here as sealing lines 36 or as sealing surfaces.

The sealing lips 26, 27 can generally also be regarded as seals 37, 38, wherein the outer sealing lip 27, which seals on the inner circumference of the outer tube 2 of the multi-chamber cartridge 1, is also referred to here as the outer seal 37, and the inner sealing lip 26, which rests sealingly on the outer circumference of the inner tube 3 of the multi-chamber cartridge 1, is also referred to here as the middle seal 38.

Due to the tapering of the inner sealing lip 26 and the widening of the outer sealing lip 27 in the direction of the front end 4 of the multi-chamber cartridge 1, a pressure which arises when pressing out the multi-chamber cartridge 1 in the intermediate space between the outer tube 2 and the inner tube 3 acts upon the inner sealing lip 26 radially inwards against the outer circumference of the inner tube 3, and upon the outer sealing lip 27 radially outwards against the inner circumference of the outer tube 2, which improves a seal.

At their circumferential end faces remote from the front end 4 of the multi-chamber cartridge 1, the two sealing lips 26, 27 merge integrally into the sealing base body 33 of the sealing element 25. Viewed in the axial direction of the multi-chamber cartridge 1 according to the invention, the circumferential sealing lines 36 or sealing surfaces of the two sealing lips 26, 27 are located in front of a circumferential front end edge, facing the front end 4 of the multi-chamber cartridge 1, of the outer seal holder 24, i.e., the sealing lines 36 or sealing surfaces of the sealing lips 26, 27 are closer to the front end 4 of the multi-chamber cartridge 1 than the front end edge of the outer seal holder 24 which axially supports the sealing element 25 when the multi-chamber cartridge 1 is pushed out.

The circumferential rear end faces of the sealing lips 26, 27 are located behind the front end edge of the outer seal holder 24 of the pushing-out element 14, viewed in the axial direction of the multi-chamber cartridge 1, i.e., the annularly circumferential transitions of the sealing lips 26, 27 into the sealing base body 33 of the sealing element 25 are at a greater distance from the front end 4 of the multi-chamber cartridge 1 than the circumferential front end face of the outer seal holder 24 of the pushing-out element 14, as a result of which the sealing lips 26, 27 are "drawn tight" when the multi-chamber cartridge 1 is pushed out. "Drawn tight" means that an axial force is introduced axially before the transitions of the sealing lips 26, 27 into the sealing base body 33 when the multi-chamber cartridge 1 is pushed out at the front end edge of the outer seal holder 24.

In addition, the sealing element 25 has a rear sealing lip 28 on its outer circumference which is offset in relation to the inner and outer sealing lips 26, 27 in the direction of the rear end 13 of the multi-chamber cartridge 1. The rear sealing lip 28 is located on the tubular collar 34 of the sealing element 25; it has a saw-tooth-shaped cross-section and likewise rests sealingly on the inner circumference of the outer tube 2 of the multi-chamber cartridge 1.

The outer seal holder 24, which is cylindrical in the exemplary embodiment, is at a distance in the longitudinal direction or in the axial direction of the multi-chamber cartridge 1 from the front side of the rear wall 15 of the pushing-out element 14 such that openings 29 are formed in circumferences of the receiving spaces 23 and accordingly at the same time also in a circumference of the pushing-out element 14 between a circumferential rear edge, facing the rear wall 15 of the pushing-out element 14, of the annular outer seal holder 24, the front side of the rear wall 15 of the pushing-out element 14, and the supports 16 which connect the outer seal holder 24 on the circumference of the rear wall 15 of the pushing-out element 14 to the rear wall 15—integrally in the exemplary embodiment. Because of the openings 29 of each receiving space 23 at the circumference of the pushing-out element 14, the outer tube 2 borders the receiving spaces 23 on the circumference to the outside, as a result of which the receiving spaces 23 have more volume for receiving the inner tube 3 of the multi-chamber cartridge 1 cut into strips than if the pushing-out element 14 were to have its own closed circumferential wall surrounding the receiving spaces 23 without the openings 29.

The perforated-disk-like sealing element 25 has a circumferential, radially outwardly-projecting bead 30 which is snapped into hook-shaped holders 31 that protrude from the front ends of the supports 16 of the pushing-out element 14 and that axially hold the sealing element 25 on the outer seal holder 24. The hook-shaped holders 31 and the bead 30 form a locking mechanism 39 which holds the sealing element 25 axially on the pushing-out element 14 or on the outer seal holder 24 of the pushing-out element 14.

With respect to the openings 29 in the circumference of the pushing-out element 14 and with respect to the cutting edges 21, the outer seal holder 24 or at least its front end edge is offset axially or, in the longitudinal direction of the multi-chamber cartridge 1, forwards in the direction of the front end 4 of the multi-chamber cartridge 1.

LIST OF REFERENCE SIGNS

Multi-Chamber Cartridge
- 1 Multi-chamber cartridge
- 2 Outer tube
- 3 Inner tube
- 4 Front end of the multi-chamber cartridge 1 or of the outer tube 2
- 5 End wall
- 6 Socket
- 7 External thread
- 8 Cover
- 9 Outlet of the inner tube 3
- 10 Rib
- 11 Outlet of outer tube 2
- 12 Intermediate space
- 13 Rear end of the multi-chamber cartridge 1 or of the outer tube 2
- 14 Pushing-out element
- 15 Rear wall
- 16 Support
- 17 free
- 18 Upright
- 19 Head pin
- 20 Partition wall
- 21 Cutting edge
- 22 Wall
- 23 Receiving space
- 24 Outer seal holder
- 25 Sealing element
- 26 Inner sealing lip
- 27 Outer sealing lip
- 28 Rear sealing lip
- 29 Opening
- 30 Bead
- 31 Holder
- 32 Annular step

33 Sealing base body
34 Tubular collar
35 Groove
36 Sealing line
37 Outer seal
38 Middle seal
39 Locking mechanism
40 Longitudinal axis
41 Shaft
42 Head
43 Sealing surface
44 Inner plunger
45 Inner seal
46 Insertion bevel
47 Undercut
48 Collar
49 Collar opening
50 Slider

The invention claimed is:

1. A multi-chamber cartridge having a longitudinal axis, having an outer tube parallel to the longitudinal axis of the multi-chamber cartridge, and an inner tube arranged in the outer tube and parallel to the longitudinal axis of the multi-chamber cartridge, having an outlet for the outer tube and the inner tube at a front end of the multi-chamber cartridge, and having a pushing-out element for pushing out the multi-chamber cartridge which is displaceably arranged in the outer tube for pushing out the multi-chamber cartridge in the direction of the longitudinal axis in the multi-chamber cartridge such that the pushing-out element pushes out contents of the outer tube and the inner tube through the outlet of the multi-chamber cartridge when the pushing-out element is displaced in the direction of the front end of the multi-chamber cartridge in the outer tube of the multi-chamber cartridge, wherein the pushing-out element has at least one cutting edge such that, upon displacement of the pushing-out element in the direction of the longitudinal axis of the multi-chamber cartridge in the direction of the front end of the multi-chamber cartridge in the outer tube, the cutting edge of the pushing-out element cuts through the inner tube in a longitudinal direction, wherein the pushing-out element has an inner plunger for pushing out the inner tube and a circumferential inner seal which rests in a circumferentially sealing manner against an inner circumference of the inner tube behind which the inner plunger tapers to form an undercut, and the inner seal of the inner plunger in the outer tube of the multi-chamber cartridge is surrounded by a cylindrical collar of the pushing-out element which surrounds the inner tube and which has a collar opening radially outside the undercut at the taper behind the inner seal of the inner plunger such that the undercut is accessible radially from outside through the collar opening in the collar of the pushing-out element.

2. The multi-chamber cartridge according to claim 1, wherein the inner seal has the shape of a cylindrical ring.

3. The multi-chamber cartridge according to claim 1, wherein the pushing-out element has a head pin as an inner plunger whose head is located at an end, facing the front end of the multi-chamber cartridge, of the head pin, the head of the head pin is located in the collar of the pushing-out element, and a circumferential surface of the head of the head pin forms the inner seal of the inner plunger.

4. The multi-chamber cartridge according to claim 1, wherein the collar of the pushing-out element has two collar openings which are opposite one another in relation to the longitudinal axis of the multi-chamber cartridge.

5. The multi-chamber cartridge according to claim 1, wherein the collar of the pushing-out element forms a seal holder for a central seal which is arranged on the seal holder of the pushing-out element and which rests circumferentially sealingly against an outer circumference of the inner tube of the multi-chamber cartridge, and/or for an outer seal, which is arranged on the seal holder, which rests circumferentially sealingly against an inner circumference of the outer tube.

6. The multi-chamber cartridge according to claim 1, wherein the cutting edge is arranged offset to the rear on the inner plunger with respect to the inner seal of the inner plunger parallel to the longitudinal axis of the multi-chamber cartridge.

7. The multi-chamber cartridge according to claim 1, wherein the cutting edge is located in an axial plane or in a plane parallel to the axial plane.

8. The multi-chamber cartridge according to claim 1, wherein the pushing-out element has several cutting edges offset relative to one another in a circumferential direction.

9. The multi-chamber cartridge according to claim 1, wherein the inner plunger tapers with an insertion bevel before the inner seal.

* * * * *